United States Patent Office 2,739,952
Patented Mar. 27, 1956

2,739,952

ORGANOPOLYSILOXANES STABILIZED WITH ORGANOPHOSPHORUS COMPOUNDS

Robert G. Linville, Ballston Lake, N. Y., assignor to General Electric Company, a corporation of New York No Drawing. Application June 24, 1953,
Serial No. 363,940

27 Claims. (Cl. 260—30.6)

This invention is concerned with organopolysiloxanes of improved properties. More particularly, the invention relates to organopolysiloxanes of improved moisture and heat stability, and methods for preparing the same, the aforesaid improved compositions comprising a mixture of ingredients comprising (1) an organopolysiloxane treated with an alkali-metal compound and containing an alkali-metal ion or atom in a reactive form, and (2) an organophosphorus compound capable of reacting with the alkali-metal ion or atom described above (whether in the form of a basic, i. e., alkaline, siloxane rearranging reagent, or as a silanolate containing an

grouping where M is an alkali-metal, for instance, sodium, potassium, lithium, cesium, etc.) to reduce or eliminate the depolymerizing or degrading effect of the alkali-metal compound or reaction products thereof with the organopolysiloxane so as to give a composition of improved stability at normal or elevated temperatures. For brevity, the term "alkali-metal ion" as employed in the present specification and claims is intended to include either the alkali metal atom or alkali-metal ion.

The term "alkali-metal compound" employed in the specification and claims is intended to mean basic siloxane rearranging and polymerization compositions containing an alkali-metal ion, which are used in the preparation of various higher molecular weight organopolysiloxanes (including organopolysiloxane oils, rubbers, resins, etc.) from lower organopolysiloxanes or mixtures of lower organopolysiloxanes. Among such alkali-metal compounds may be mentioned, for instance, alkali-metal hydroxides (having the formula MOH where M is an alkali-metal, for instance, sodium, potassium, lithium, rubidium and cesium); alkali-metal alkoxides (having the formula MOR where M has the meaning given above and R is an alkyl radical, for instance, methyl, ethyl, propyl, isopropyl, butyl, hexyl, etc.); alkali-metal thio-alkoxides (having the formula MSR where M and R have the meanings given above); alkali-metal silanolates [e. g., those having the formula $R'_m(OH)_{3-m}Si—OM$ where R' may be a member selected from the class consisting of alkyl (including acyclic and alicyclic), aryl, alkaryl, aralkyl, etc., hydrocarbon radicals, m is an integer equal to from 1 to 2, inclusive, and M has the meaning given above (as shown, for instance, in U. S. Patent 2,587,636)]; alkali-metal complexes of aromatic compounds (e. g., potassium complexes with naphthalene or with anthracene, etc.); alkali-metal complexes having the formula $(ROH)_xMOH$ where R and M have the meanings given above and $x$ is a value equivalent to from 0.5 to 2.5 (for instance, $CH_3OH.NaOH$ having a neutral equivalent of 74.7, $—KOH—[(CH_3)_2CHOH]_{1.85}$ having a neutral equivalent of 167, etc., as well as other compositions of the type described in U. S. Patent 2,634,252); alkali-metal salts of organopolysiloxanes, for instance, the sodium salt of tetramethyldisiloxanediol, etc. (see U. S. Patent 2,634,284), etc.

One of the requisites for the alkali-metal compound is that it be sufficiently alkaline or basic in nature to effect the desired siloxane rearrangement and polymerization of the various organopolysiloxanes with which the present invention is concerned at temperatures of the order of 80° to 175° C. This basicity may be determined by dissolving or dispersing the alkali-metal compound and determining whether it gives a pH above 7, preferably above 10. Adequate basicity may be determined by measuring an aqueous solution or dispersion of the alkali-metal compound at a concentration not greater than 0.1 N and determining whether it has the desired alkaline pH. An alkali-metal compound of adequate basicity is generally one which when dissolved or dispersed in water can be titrated with acids to a neutral endpoint. The alkali-metal compound may be a suitably basic (i. e., alkaline) compound which is the salt of a weakly acidic ion such that the compound in contact with water gives an alkaline reaction. Accordingly, the term "alkali-metal compound" is not intended to be limited to the specific types of such compounds described above, but rather is intended to include these as well as other basic alkali-metal compounds capable of acting in the same fashion for the designated purpose.

In the preparation of organopolysiloxane oils, resins or rubbers, various alkaline catalysts or polymerizing agents are employed for effecting rearrangement of siloxane linkages. Thus, in the preparation of organopolysiloxane oils, it is often desirable to effect chain-stopping of organopolysiloxanes so as to improve the stability of the silicone oil. It has, therefore, become a practice to effect interpolymerization between various organopolysiloxanes, for instance, polydimethylsiloxanes of the formula I   $(R_2SiO)_m$ and low molecular weight linear polysiloxanes of the formula

II

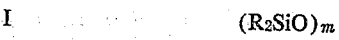

where R is a monovalent organic radical, for instance, a monovalent hydrocarbon radical (e. g., alkyl, aryl, aralkyl, alkaryl, etc.; halogenated hydrocarbon radicals, for instance, chlorinated monovalent hydrocarbon radicals, for instance, mono- or polychlorinated aryl radicals, etc.), $m$ is an integer equal to from 3 to 9 or more, and $n$ is a whole number equal to from 0 to 6, by employing alkaline siloxane rearranging agents, for instance, alkali-metal hydroxides such as sodium hydroxide, potassium hydroxide, lithium hydroxide, etc., to obtain long-chain organopolysiloxanes of the formula

III

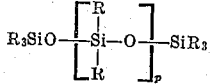

where $p$ is a whole number greater than 1, for instance from about 6 to 200 or higher. R in the above formulae may be the same or different organic radicals and more specifically may be an alkyl radical (including acyclic and alicyclic radicals), for instance, methyl, ethyl, propyl, etc.), or aryl radicals etc., for instance, phenyl, naphthyl, etc.; or combinations of methyl and phenyl radicals, including halogenated (e. g., chlorinated) phenyl radicals where lubricating oils of improved lubricity are desired. Many of the organopolysiloxanes defined by Formula III are found disclosed and claimed in Patnode Patents 2,469,888 and 2,469,890 assigned to the same assignee as the present invention, and in Fletcher e al. Patent 2,599,984. In the past acidic catalysts have been employed for effecting rearrangement between the various siloxanes, as, for instance, those defined by Formulae I and II. It has been found, however, more advantageous to use alkali-metal compounds, e. g., alkali-metal hydroxides, in place of the acidic catalysts (or rearrangement agents) previously employed.

However, there are some disadvantages in using these alkaline catalysts, for instance, alkali-metal hydroxides. Thus, it is believed that in the rearrangement and polymerization of organopolysiloxanes, the alkali-metal compound, taking potassium hydroxide as a specific example, acts as a chain-stopping agent in the form of an

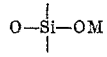

radical (where M is an alkali-metal atom), for instance, an

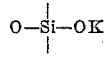

grouping, so as to give a polysiloxane in the reaction mixture which is relatively unstable at elevated temperatures. When the reaction product is thereafter heated, for instance, for the purpose of removing any volatile or low boiling materials (which requires temperatures of the order of about 200° C. or higher), to give a more desired product, it has been found that any residual potassium hydroxide or salts of potassium hydroxide (including potassium silonolates), deleteriously affect the stability of the organopolysiloxane causing degradation of the higher molecular weight organopolysiloxanes to lower molecular weight reaction products. This is obviously undesirable since unduly large losses are obtained due to decreased yields of the higher molecular weight product.

The same difficulties have been encountered in preparing organopolysiloxane resins wherein mixtures of organopolysiloxanes are interpolymerized to give an organopolysiloxane product of the desired organic-to-silicon ratio. Thus, employing alkaline materials, e. g., alkali-metal hydroxides for the purpose, it is usually desirable to effect interpolymerization between polymethylsiloxanes, including polydimethylsiloxanes, polymonomethylsiloxanes, and small amounts of organopolysiloxanes having the formula

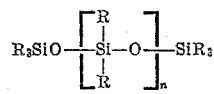

either alone or with polyarylsiloxanes, for example, polyphenylsiloxanes, where R is a monovalent hydrocarbon radical, preferably a methyl radical, and $n$ has the meaning given above. In addition, after organopolysiloxane resins (e. g., those having a ratio of from about 1.2 to 1.8 organic groups per silicon atom) are prepared, it is often desired to body such products to a higher molecular weight material whereby it can be more readily cured under the influence of heat in the presence of a curing agent. Generally, such bodying catalysts may comprise alkaline materials such as alkali-metal hydroxides. However, it has been found that after the above-described interpolymerization reaction and the bodying operation have been completed, and the silicone resin thereafter cured by means of heat and curing agents (such as driers, for instance, lead naphthenate, zinc octoate, etc.), the presence of the alkali-metal compound tends to affect deleteriously the organopolysiloxane especially at the elevated temperatures at which silicone resins are expected to operate.

Moreover, in the preparation of organopolysiloxanes which can be converted to the cured, solid, elastic state (to forms known as "silicone rubbers") it is often desirable to effect polymerization of low molecular weight organopolysiloxanes to higher molecular weight products (which are usually extremely viscous or gummy solids) which can then be compounded with fillers and curing agents (the curing agent may be omitted, if desired, and other means of curing used such as electron curing), and thereafter molded under heat and pressure or used in coating applications at elevated temperatures to give cured, solid, elastic products. During the preparation of these convertible organopolysiloxanes (that is, the highly viscous or gummy solid organopolysiloxanes which are curable under the influence of heat and a curing agent, or are curable by other suitable means, for instance, by irradiation with high energy electrons), various polymerizing agents, for instance, the above-mentioned alkali-metal compounds are employed for making these convertible materials. Again it has been found that after obtaining these convertible organopolysiloxanes, it is often desirable to remove the low boiling organopolysiloxanes present therein. However, great difficulty has been encountered in the past, unless extreme precautions are observed due to the fact that degradation of the organopolysiloxanes occurs due to what is believed to be the presence of either residual alkali-metal compounds, such as alkali-metal hydroxides or siloxane chain terminating alkali-metal oxide groups attached directly to silicon as is shown by the grouping

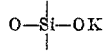

using potassium as an example of the alkali-metal atom.

Again, if this type of alkali-metal compound is permitted to remain in the convertible organopolysiloxane and curing of the latter caused to take place, it will be found that after extended periods of time at temperatures of the order of about 250° C. or after short periods of time at 300° C., the organopolysiloxane polymer will eventually decompose.

These difficulties can be obviated to some degree by carefully removing, for instance, by washing or neutralization, any alkaline condensing agent used for polymerization purposes. However, despite the utmost precaution in washing or neutralization, it is often difficult to remove the last traces of the alkali-metal compound. Even if effective neutralization is accomplished, washing of the neutralized product will often fail to remove all traces of the salts resulting from the neutralization, so that at elevated temperatures there may occur decomposition of the neutral salt to give residues which again can exert their depolymerizing or degrading effect on the organopolysiloxane.

It is therefore one of the objects of this invention to improve the heat stability of organopolysiloxane oils, rubbers and resins, where such organopolysiloxanes contain an alkali-metal compound.

Another object of the invention is to permit removal of low boiling or volatile materials from organopolysiloxanes treated with alkali-metal compounds.

A further object of the invention is to prepare cured, solid, elastic organopolysiloxanes which have improved heat stability even after being subjected to temperatures as high as 300° C. for from 50 to 100 hours or more.

Another important object of the invention is to minimize structure build-up in filled, convertible organopolysiloxanes, and to permit the use of fillers which do not heat-age satisfactorily or which heretofore have been employed with great difficulty due to undesirable structure build-up (i. e., "nerve" or increase in hardness, etc., requiring excess milling times to reduce the curable compound to a usable, fabricatable degree of plasticity).

A still further object of the invention is to prevent undesirable depolymerization and degradation of organopolysiloxanes at elevated temperatures due to the presence of alkali-metal compounds.

An additional object of this invention is to improve the room temperature stability under varying humidity conditions, of various organopolysiloxanes, particularly organopolysiloxanes convertible to the cured, solid, elastic state.

Other objects of the invention will become apparent from the description of the invention which is found below.

I have now discovered that all the objects hereinbefore recited can be attained and the disadvantages mentioned above obviated by incorporating in an organopolysiloxane which has previously been treated with an alkali-metal compound (for instance for the purpose of effecting siloxane rearrangement in or polymerization of the organopolysiloxane) an organophosphorus compound (or mixtures of organophosphorous compounds) which are capable of exerting a beneficial effect on the aforementioned treated organopolysiloxane, for instance, to stabilize the latter, plasticize the treated organopolysiloxane, etc. The organopolysiloxane treated with the alkali-metal compound may contain either residues of the alkali-metal compound, for instance, residues of alkali-metal hydroxides, or the organopolysiloxane may contain reaction products of the latter with the alkali-metal compound as, for instance, the alkali-metal ion of the alkali-metal compound may attach to the silicon of the organopolysiloxane by various means usually through the medium of an oxygen atom. In whatever form the alkali-metal compound may be after treatment of the organopolysiloxane, it is usually desirable for optimum stability of the organopolysiloxane to reduce the depolymerizing or degrading effect of the alkali-metal compound or reaction products thereof at either normal or elevated temperatures.

The term "organophosphorus compound" used throughout the description of the invention and in the claims is intended to mean and include compositions (both in the monomeric and polymeric form) containing a phosphorus atom and an organic radical in combination with other atoms usually associated in connection with organophosphorus compounds, for instance, hydrogen atoms, oxygen atoms, sulfur atoms, selenium atoms, alkali-metal atoms, halogen atoms (e. g., halogen bonded directly to carbon), nitrogen atoms, etc. Many organophosphorus compounds suitable in the practice of the present invention may be found disclosed in the book Organophosphorus Compounds by G. M. Kosolapoff, published by John Wiley and Sons, New York, New York (1950). The prime requisites for these organophosphorus derivatives (also hereinafter referred to as "alkali-metal deactivating organophosphorus compounds") are that they be reactive toward the above-described alkali-metal compounds or reaction products of the latter with organopolysiloxanes, and be capable of minimizing or eliminating any deleterious effects which the alkali-metal compound described above or reaction products thereof may have on the organopolysiloxane treated with the said alkali-metal compound. In addition, it is desirable (although not essential, since suitable precautions can be taken) that the organophosphorus compound be non-toxic, and accordingly organophosphorus compounds containing phosphorus-bonded halogen (e. g., chlorine) should be avoided. Finally, the organophosphorus compound should not deleteriously affect the organopolysiloxane, nor should products formed as a result of its stabilizing action on or reaction with the alkali-metal atom or ion have a deleterious effect on the organopolysiloxane.

Among such organophosphorus compounds which may be employed in the practice of the present invention are, for instance, compositions having the general formulae:

a. (RO)₃PO (organic tertiary phosphates)
b. R'(RO)₂PO (organic phosphonates)
c. (RO₃)P (organic tertiary phosphites)
d. RP(OH)₂ (organic phosphinic acids)
e. R'PO(OH)₂ (organic phosphonic acids)
f. (RO)₂P(O)H (organic secondary phosphites)
g. RPO₂H₂ (organic phosphonous acids)

in which organic phosphorus compounds, R and R', are the same or different organic radicals, for instance, alkyl radicals, including acyclic and alicyclic radicals (e. g., methyl, ethyl, propyl, isopropyl, butyl, decyl, etc.); aryl radicals (e. g., phenyl, naphthyl, biphenyl, etc.); aralkyl radicals (e. g., benzyl, phenylethyl, etc.); alkaryl radicals (e. g., tolyl, xylyl, ethylphenyl, etc.); unsaturated aliphatic (or alkenyl) radicals (for instance, vinyl, allyl, methallyl, crotyl, etc.), cycloaliphatic radicals (e. g., cyclohexyl, cyclopentyl, cyclohexenyl, etc.), as well as monovalent hydrocarbon radicals containing substituents thereon which are inert to the organopolysiloxane, for instance, halogen, such as chlorine, bromine, fluorine, etc., the nitro group, etc. Under such circumstances, the substituted radicals may comprise, for instance, chlorophenyl radicals, chlorotolyl radicals, chloroethyl radicals, etc. Preferably, the organophosphorus compound is one which has in its molecule at least one aryl or alkaryl radical, for instance, a phenyl, cresyl, etc., radical attached to phosphorus through an oxygen atom. The abovementioned compounds may be modified so that a sulfur or selenium atom replaces the oxygen atom, as, for instance, in thiophosphates, thiophosphites, organophosphorus selenides [e. g., (C₆H₅S)₃PSe, (C₆H₅O)₃PSe, etc.], etc.

Among the more specific organophosphorus compounds which may be employed in the practice of the present invention may be mentioned, for instance, organic hydrogen phosphorus compounds, e. g., diethyl hydrogen phosphate, diphenyl hydrogen phosphate, stearyl dihydrogen phosphate; triphenyl phosphate, tricresyl phosphate, tris-(p-tertiary-butylphenyl) phosphate, tributyl phosphate, trioctyl phosphate, dibutyl phenyl phosphate [having the formula (C₄H₉O)₂(C₆H₅O)PO], diethyl phenylphosphonate, diphenyl butyl phosphite, triphenyl phosphite, phenylphosphinic acid, ethylphosphinic acid, phenylphosphinic acid, triphenyl thiophosphate, dicresyl dichloropropylphosphonate; beta, gamma unsaturated dialkenyl arylphosphonate esters, e. g., alkenyl phenylphosphonates (many examples of which are disclosed in U. S. Patents 2,425,765; 2,453,167 and 2,497,637), vinyl diethyl phosphonacetate (more particularly described in U. S. Patent 2,478,441), etc. Additional examples of organophosphorus compounds may be found, for instance, in U. S. Patents 2,614,990; 2,618,600, etc. By reference, these patents as well as other prior art publications showing organophosphorus compounds [including polymeric organophosphorus compositions having a phosphorus-bonded —OR group, e. g., (RO)₂P(O)—O—P(O)(OR)₂, where R has the meaning given above] capable of acting in the desired fashion, are made part of the disclosures of the instant application.

In addition to the organophosphorus compounds described above, it will be apparent that many other organophosphorus compounds may be used without departing from the scope of the invention. These include organophosphorus compounds which contain, in addition to an organic radical and a phosphorus atom, other ions, for instance, metallic ions. Among such compositions may be mentioned compounds having the general formulae:

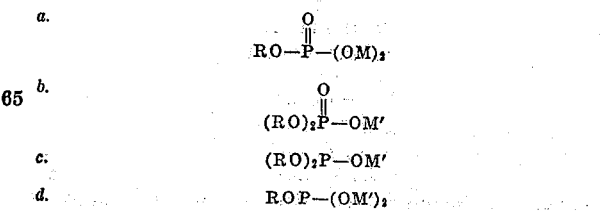

where R has the meaning given above, and M' is a metallic cation, e. g., calcium, barium, iron, etc. Examples of such organophosphorus compounds are, for instance, calcium phenyl phosphate, calcium di-(dibutyl phosphate), barium di-(diphenyl phosphate).

In addition to the various organophosphorus compounds described above containing phosphorus-bonded oxygen, one may also employ other derivatives thereof based on replacement of one or more oxygen atoms of the organophosphorus compounds with either a sulfur atom, or a selenium atom, or even a tellurium atom, or where all phosphorus-bonded oxygen atoms are replaced with the aforementioned sulfur, selenium etc., atoms.

It will, of course, be understood that, although all the organophosphorus compounds employed in the practice of the present invention may not act exactly as postulated, nevertheless, the above description of the organophosphorus compound will enable persons skilled in the art to determine readily the proper alkali-metal inactivating organophosphorus compounds to be used. The employment of organophosphorus compounds containing the P—OH grouping may result in the formation of P—OM radicals (where M is an alkali-metal atom) as a result of the reaction of the former with the alkali-metal compound or reaction products of the latter with the organopolysiloxane. Removal of the alkali-metal atom as a degrading or depolymerizing influence may give rise to silanol groupings

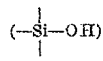

which will not be harmful as far as degrading of the organopolysiloxane is concerned. Too large an excess of the organophosphorus compound containing a —POH grouping should be avoided if optimum results are desired.

The amount of organphosphorus compound (hereinafter so designated to include the various organophosphorus compounds described and taught above, including phosphates, phosphites, phosphonates, phosphinates, thiophosphates, etc.) which may be employed in the practice of the present invention may be varied widely, depending upon such factors as, for instance, the organophosphorus compound used, type of organopolysiloxane, amount of alkali-metal compound used in the preparation or treatment of the organopolysiloxane, the use to which the organopolysiloxane will be put, the amount of alkali-metal compound or reaction product thereof calculated as being present in the organopolysiloxane, etc. In general, improved results are obtained when the amount of the organophosphorus compound employed is equal to at least 0.1 mol thereof per mol of alkali metal present in the siloxane or freely available as the alkali-metal compound. The amount of alkali metal present (in the form of products obtained by treatment of the organopolysiloxane with the alkali-metal compound, or free alkali-metal compound present) may be that which has initially been added for various purposes, particularly polymerization purposes, or may be the amount which is calculated as being present in the treated organopolysiloxane (after some purification for the purpose of removing excess alkali-metal has taken place). The amount of the organophosphorus compound added is not critical and one may employ as much as 50 or more molecular equivalents of the organophosphorus compound per molecular equivalent of alkali-metal present in the siloxane. On a weight basis, for stabilization purposes one may use effectively up to about 3 per cent or more (e. g., from 0.0001 to 2 per cent) of the organophosphorus compound based on the weight of the organopolysiloxane.

Larger amounts of certain of the organic phosphorus compounds (e. g., from 5–20% by weight based on the weight of the organopolysiloxane), such as for instance those which are completely organic substituted [for example, organophosphorus esters having the formulae (RO)₃PO and (RO)₃P where R has the meaning given above, organic phosphinates and organic phosphonates in which all the hydrogens of the hydroxyl groups are substituted by an organic group, for instance an R group, etc.] may be employed if desired either in the intermediate or final stages of use. In some respects, excess amounts (i. e., in excess of that required for stabilizing purposes) of their particular types of organophosphorus compounds, particularly when used in combination with convertible organopolysiloxanes which in the cured state are solid, elastic compositions, appear to exercise a plasticizing effect on and a reduction in the hardness of the convertible organopolysiloxane and permit better extrusion of the convertible organopolysiloxane when the latter is compounded with various fillers, pigments, dyes, curing agents, etc., and thereafter extruded, for instance, in the making of insulated conductors. When the organophosphorus compound is employed either primarily or secondarily as a plasticizer for the organopolysiloxane, it is usually desirable that the organophosphorus compound have a fairly high boiling point and a low vapor pressure to minimize undesirable losses thereof when used in high temperature applications.

Additional advantage to be derived from using the organophosphorus compounds described above, particularly in connection with the convertible organopolysiloxanes, is that incorporation of the organophosphorus compound permits better control of the convertible organopolysiloxane either for storage purposes or in molding operations. Thus, it has been found that whereas organopolysiloxanes convertible to the cured, solid, elastic state are highly sensitive to humidity conditions and vary in processability depending upon the degree of moisture in the air, the incorporation of an organophosphorus compound in such a convertible organopolysiloxane which has been prepared by treatment with an alkali-metal compound (for polymerization purposes), minimizes this sensitivity and enables the organopolysiloxane to remain stable in viscosity and consistency despite varying changes in humidity. Ordinarily, it has been found in the absence of the organophosphorus compound, that moisture causes the polymer to decrease in viscosity and to become what is known as "soupy" which make it very difficult to handle or process. Finally, it has also been found that the presence of the organophosphorus compound, especially in plasticizing proportions permits easier milling on rubber rolls and reduces structure ("nerve") or buildup of structure on the rolls. Thus, by means of my invention, it is possible to mill harder convertible organopolysiloxanes on the rolls with less trouble.

An additional advantage realized from the incorporation of the organophosphorus compound in a convertible organopolysiloxane derived from an organopolysiloxane treated with an alkali-metal compound is that certain difficultly usable fillers (which cause a buildup in structure and tend to impart undesirable nerve to the convertible organopolysiloxane) can now be advantageously employed without any problem of structure build-up. Finally, it has also been discovered that certain curing agents which are poisoned by residues of the alkali-metal compound or combined forms of the alkali-metal compound with the siloxane, can now be used if prior to incorporation of these curing agents, the organophosphorus compound is added to the alkali-metal-containing organopolysiloxane.

The convertible organopolysiloxane herein described which as pointed out above may be highly viscous masses or gummy elastic solids, depending on the state of condensation, the alkaline condensing agent employed, the starting organopolysiloxane or organopolysiloxanes used to make the convertible organopolysiloxane, etc., will hereinafter as referred to above be called "convertible organopolysiloxane" or more specifically as "convertible methyl polysiloxane" and "convertible methyl and phenyl polysiloxane." Although convertible organopolysiloxanes with which the present invention is concerned are well-known, for purposes of showing persons skilled in the art, the various convertible organopolysiloxanes may be employed in the practice of the present invention, attention is directed to the convertible organopolysiloxanes disclosed and claimed in Agens Patent 2,448,756 and Sprung et al. Patent 2,448,556 both issued September 7, 1948, Sprung Patent 2,484,595, issued October 11, 1949, Krieble et al. Patent 2,457,688 issued December 28, 1948, Marsden Patent 2,521,528 issued September 5, 1950, Warrick Patent 2,451,137 issued February 13, 1951, and Hyde Patent 2,490,357 issued December 6, 1949. In connection with the latter Hyde Patent 2,490,357, this patent discloses the use of various alkaline material including alkali-metal hydroxides for converting low molecular weight organopolysiloxanes to higher molecular weight organopolysiloxane including those which may be useful in the preparation of organopolysiloxane oils, resins and rubbers.

It will, of course, be understood by those skilled in the art that other convertible organopolysiloxanes containing the same or different silicon-bonded organic substituents (e. g., methyl, ethyl, propyl, phenyl, tolyl, xylyl, benzyl, phenylethyl, naphthyl, chlorophenyl, both methyl and phenyl, etc., radicals) connected to silicon atoms by carbon-silicon linkages, may be employed without departing from the scope of the invention.

The particular convertible organopolysiloxane used is not critical and may be any one of those described and well-known heretofore where they are obtained by condensing, in the presence of an alkali-metal compound, for instance, an alkali-metal hydroxide (e. g., potassium hydroxide, cesium hydroxide, etc.) an organopolysiloxane or mixture of organopolysiloxanes containing an average of from about 1.95 preferably from about 1.98 to about 2.1 organic groups per silicon atom. These convertible organopolysiloxanes generally comprise polymeric diorganosiloxanes which may contain, if desired up to 2 mol percent copolymerized mono-organosiloxane, for example, copolymerized monomethylsiloxane. Generally, I prefer to use as the starting organopolysiloxane from which the convertible, for example, heat-convertible organopolysiloxane is prepared, one which contains about 1.99 to 2.01, inclusive organic groups, for example, methyl groups per silicon atom and where more than about 80% of the silicon atoms in the polysiloxane contain two silicon-bonded alkyl groups.

The starting organopolysiloxanes used to make the convertible organopolysiloxanes, which ultimately become the cured, solid, elastic organopolysiloxane, by polymerization thereof in the presence of an alkali-metal compound, preferably comprise organic substituents consisting essentially of monovalent organic radicals attached to silicon through carbon-silicon linkages in which the siloxane units consist essentially of the structural formula $R_2SiO$, where R is preferably a radical of a group consisting of methyl and phenyl radicals. The polysiloxane may be one in which essentially all the siloxane units are $(CH_3)_2SiO$, or the siloxane may be a copolymer of dimethylsiloxane and a minor amount (e. g., from 1 to 20 or more mol percent) of any one of the following units alone or in combination therewith:

$$C_6H_5(CH_3)SiO \text{ and } (C_6H_5)_2SiO$$

At the present time, the convertible organopolysiloxanes are prepared by polymerizing cyclic polydimethylsiloxanes, for instance, either octamethylcyclotetrasiloxane, mixtures of the latter material with other cyclic polymers of dimethylsiloxane, for instance, hexamethylcyclotrisiloxane, decamethylcyclopentasiloxane, etc., alone or with other polyorganosiloxanes, for instance, polydiethylsiloxanes (for example, octaethylcyclotetrasiloxane), octaphenylcyclotetrasiloxane, hexaphenylcyclotrisiloxane, etc. In each instance where one is polymerizing a single organopolysiloxane or mixture of organopolysiloxanes to give the convertible organopolysiloxane in the highly viscous or gummy state, the use of alkali-metal compounds as polymerizing agents, for instance, alkali-metal hydroxides are advantageously employed for the purpose. However, the use of such alkaline materials poses the various problems described above which the instant invention is designed to cure.

In making the cured organopolysiloxanes of improved heat stability and having the other desirable properties recited above, it is generally desirable to incorporate a small amount of a curing agent, for instance, benzoyl peroxide, tertiary butyl perbenzoate, azonitriles, e. g., 2,2'-azobisisobutyronitrile, etc. These curing agents which may be present in an amount equal to from about 0.1 to 8% or more and preferably from about 2 to 6 per cent, by weight, based on the weight of the convertible organopolysiloxane, function to yield cured products having better properties, for instance, improved elasticity, tensile strength and tear resistance, than is obtained by curing a similar composition from which the curing agent has been omitted. Alternatively, one may employ high energy electrons for the purpose of curing the convertible organopolysiloxane in the manner more particularly described and claimed in Lawton and Lewis patent application, Serial No. 291,542 filed June 3, 1952, and assigned to the same assignee as the present application.

Obviously, other modifying ingredients can be added to the convertible organopolysiloxanes, for instance, various fillers, preferably in the finely divided form, such as, for instance, titanium dioxide, silica aerogel, lithopone, diatomaceous earth, fumed silicas, finely divided gamma alumina, etc. (which for brevity are referred to hereinafter as "metallic oxides"), calcium carbonate, polytetrafluoroethylene particles and fibers, etc. The proportion of filler added may, of course, be varied within wide limits and may range, by weight, from about 0.05 to about 3 or more parts of filler per part of convertible organopolysiloxane. After incorporating the filler and curing agent, if desired, in the organopolysiloxane employing various compounding and mixing techniques now well known in the art, the convertible organopolysiloxane may be heated under pressure at temperatures ranging from about 125 to 150° C. for times of the order of about 5 minutes to one-half hour under pressures ranging from about 200 to 1000 p. s. i. or more. It is advantageous in the case of molded products to complete the cure of the organopolysiloxane by heating the latter at elevated temperatures of the order of about 250° C. or higher for times ranging from 12 to 36 hours.

The method whereby the organopolysiloxanes are stabilized at elevated temperatures and other advantages realized by means of the employment of the organophosphorus compounds in combination with the aforesaid organopolysiloxanes is not clearly understood. It is believed, however, that the stabilization and many other advantages inherent in my invention are obtained because of the following reactions which are believed to occur between the organopolysiloxane and the alkali-metal compound polymerizing agent taking as an example the condensation of a methylpolysiloxane with potassium hydroxide as the polymerizing agent and using triphenyl phosphate $[(C_6H_5O)_3PO]$ as an example of the organophosphorus compound. The reaction is believed to proceed in accordance with the following abbreviated equation:

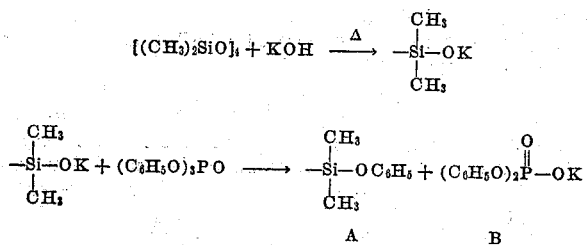

A         B

The number of phenyl groups caused to react with the potassium salt will vary depending on the molar proportion of the organophosphorus compound and the potassium silanolate. In some cases it may be desirable to vary the proportions of the reactants, for instance, the potassium silanolate and organophosphorus compound, in such a manner to produce mainly the monopotassium phosphate, e. g.,

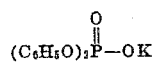

in other cases one may produce mainly the dipotassium phosphate, e. g.,

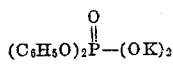

In many instances, several alkali-metal phosphates of the type described above are produced. The residue A described in the second equation is extremely heat-stable at elevated temperatures. The residual compound identified by B and having the formula

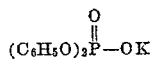

is also quite stable and inert at elevated temperatures and appears to exert no deleterious effects, nor does it appear to decompose in contact with the organopolysiloxane. The above description is believed to be one method by which the organophosphorus derivative operates in the practice of my invention when the alkali-metal atom is part of the siloxane molecule. Similar reactions are believed to occur when free residual alkali-metal compounds, e. g., alkali-metal hydroxides, are present in the organopolysiloxane. However, I do not intend to be limited to any of these theories since conceivably there may be other explanations for the unexpected and unobvious improvement in stability of the organopolysiloxanes realized by means of my invention.

In order that those skilled in the art may better understand how the present invention may be practiced, the following examples are given by way of illustration and not by way of limitation. All parts are by weight.

EXAMPLE 1

This example illustrates the ability to stabilize organopolysiloxane oils by means of the incorporation of the organophosphorus derivative so that it is possible to strip the low boiling or volatile materials from the silicone oil (obtained by intercondensation of a mixture of organopolysiloxanes using an alkaline condensing agent, specifically potassium hydroxide) with a minimum of depolymerization or degradation of the higher molecular weight products. About 1000 parts octamethylcyclotetrasiloxane was added to a polymerization kettle and the methylpolysiloxane heated to 150° C. While at this temperature, 0.1 part potassium hydroxide and 13.3 parts of decamethyltetrasiloxane was added and the oily mixture heated for about four hours at 150° C. to effect intercondensation of the methylpolysiloxanes to give a mixture of ingredients comprising linear methyl polysiloxanes of varying molecular weights but of about 2500 cp. viscosity wherein the linear chains were chain-stopped with trimethylsiloxy groups. When a sample of this oil was heated at 300° C. for 30 minutes to effect removal of the low boiling volatile materials, it was found that at this temperature, the equilibrated polysiloxane was almost completely depolymerized to lower molecular weight products. However, when about 0.72 part triphenylphosphate was intimately dispersed in the hot organopolysiloxane fluid immediately after preparation of the same, the equilibrated methylpolysiloxane could be heated at 300° C. for 30 minutes to remove all volatiles and showed a weight loss of only 19%, most of which were the low-boiling volatiles. The viscosity of this oil prior to stripping of the volatiles was about 2500 cp., while after removal of the volatiles, the viscosity increased to 4300 cp. This oil could be easily filtered and was found to be stable at elevated temperatures.

EXAMPLE 2

In this example, 400 parts octamethylcyclotetrasiloxane was charged to a reaction vessel equipped with an agitator, and the methylpolysiloxane heated to a temperature of 150° C. at which time 0.04 part finely divided potassium hydroxide and 0.132 part decamethyltetrasiloxane were added. The polymerization of the mixture of ingredients was carried out for four hours at 150° C. until a highly viscous product was obtained. When a sample of this methylpolysiloxane was placed in a 300° C. oven for 30 minutes, it was found that there was about a 99% weight loss in the sample. In contrast to this, when varying amounts of triphenyl phosphate or tricresyl phosphate were added to the product obtained after the 150° C. heating, and samples thereafter placed in a 300° C. oven for 30 minutes, it was found that the amount of weight loss ranged from about 16 to 18 per cent. Thus, it was found that when one added either 5 parts triphenyl phosphate (slightly over 20 mols of the latter per mol KOH used), or 0.5 part triphenyl phosphate (slightly over 2 mols triphenyl phosphate per mol potassium hydroxide used), or 0.1 part triphenyl phosphate (slightly over 0.4 mol triphenyl phosphate per mol of potassium hydroxide used), or 0.2 part tricresyl phosphate (slightly less than 1 mol tricresyl phosphate per mol of potassium hydroxide used), or even only 0.05 part triphenyl phosphate (slightly more than 0.2 mol triphenyl phosphate per mol potassium hydroxide used), the volatile weight loss after heating the samples at 300° C. for 30 minutes ranged from about 16-18 per cent and was only slightly higher (about 19 to 20 weight per cent loss) in the case of the addition of the 0.05 part triphenyl phosphate.

The foregoing two examples illustrate how it is possible to avoid the necessity of either neutralizing or removing the alkaline equilibrating or polymerizing agent prior to stripping the low boiling volatiles from the condensed organopolysiloxane, thus permitting more rapid and more economical handling of these types of organopolysiloxanes.

EXAMPLE 3

In this example, 400 parts of octamethylcyclotetrasiloxane was added to a polymerization kettle and mixed with 0.04 part potassium hydroxide and 0.132 part decamethyltetrasiloxane. The mixture of ingredients was then heated to about 150° C. for a time sufficient to give a methylpolysiloxane having a viscosity of about 25,000 cp., at which point 60 parts octaphenylcyclotetrasiloxane was added, and the mixture thereafter heated at around 135 to 150° C. for about 4 hours to give a high viscosity methyl phenyl polysiloxane. When a sample of this material was heated at 300° C. for 30 minutes, it was found that the weight loss was approximately 99%. However, when only 0.1 part triphenyl phosphate was added to the high viscosity composition, the weight loss of a sample thereof maintained at 300° C. for 30 minutes was of the order of about 15 to 16 per cent. It is thus clearly apparent that the addition of the organophosphorus compound to a methyl phenyl polysiloxane also serves to stabilize this type of organopolysiloxane at elevated temperatures.

EXAMPLE 4

This example illustrates the effect of organophosphorus compounds on organopolysiloxanes employed in preparing organopolysiloxane elastomers or silicone rubbers. More particularly, 400 parts octamethylcyclotetrasiloxane was charged to a reaction vessel equipped with an agitator. Thereafter, the mixture was heated to a temperature of about 150° C. at which point 0.04 part potassium hydroxide and 0.132 part decamethyltetrasiloxane were added and the mixture heated for about 4 hours until a highly viscous composition (hereinafter designated as "convertible polydimethylsiloxane") which had scarcely any flow at room temperature was obtained. Varying amounts of triphenyl phosphate, tricresyl phosphate, or triphenyl phosphite were added to samples of this convertible polydimethylsiloxane, and portions of each of the inactivated polymers were then compounded with silica aerogel (Santocel CS sold by Monsanto Chemical Company), and benzoyl peroxide on a rubber mill, molded into the form of flat sheets at about 150° C. for about 20 minutes under a pressure of about 500 p. s. i., and thereafter further heat-aged for 24 hours at 250° C., and an additional 96 hours at 250° C. and 24 hours at 300° C., after which time each sample was tested for tensile strength and percent elongation. The following formulation shows the percentages of convertible polydimethylsiloxane, silica aerogel, and benzoyl peroxide:

|  | Parts |
|---|---|
| Convertible polydimethylsiloxane | 400 |
| Silica aerogel | 180 |
| Benzoyl peroxide | 6.6 |

Table I below shows the proportion of organophosphorus compound employed in connection with the various molded samples, including one from which the organophosphorus compound was omitted.

Table I

| Sample No. | Organophosphorus Compound | Parts organophosphorus compound per 400 parts convertible polydimethylsiloxane | Ratio mols organophosphorus compound per mol KOH |
|---|---|---|---|
| 1 | None (Control) | None | None. |
| 2 | Triphenyl phosphate | 0.1 part | Slightly less than ½/1. |
| 3 | Tricresyl phosphate | 0.2 part | Slightly less than 1/1. |
| 4 | Triphenyl phosphate | 0.3 part | Slightly more than 1/1. |
| 5 | Triphenyl phosphite | 0.15 part | Slightly less than 1/1. |
| 6 | Triphenyl phosphate | 0.5 part | Slightly more than 2/1. |
| 7 | do | 0.1 part | Slightly less than ½/1. |
| 8 | Triphenyl phosphite | 1.0 part | Slightly less than 5/1. |

Table II below shows the physical properties of the various samples after the specified heat-aging tests.

EXAMPLE 5

This example illustrates the benefit of employing organophosphorus compounds in combination with alkaline-condensed organopolysiloxanes which are to be used for coating purposes, especially as coatings for glass cloth. More particularly, about 400 parts of the convertible methylpolysiloxane described in Example 4 and containing triphenyl phosphate in the amounts stipulated below in Table III were mixed with about 200 parts calcium carbonate and 18 parts benzoyl peroxide. Samples of this mixture of ingredients were intimately mixed by suitable means with sufficient xylene to form a homogeneous, substantially stable dispersion having a solids content of about 34 per cent. Glass cloth was thereafter coated with each of the samples containing the varying amounts of triphenyl phosphate and heated for about two hours at 125° C. to remove the solvent and thereafter further heated for 17 hours at 315° C. At the end of this time, the coated cloth was weighed to determine the amount of coating compound retained on the cloth. As a control, the same glass cloth was coated with the same materials described above with the exception that a similar convertible methylpolysiloxane from which the triphenyl phosphate was omitted, was used. The following Table III shows the amounts of triphenyl phosphate employed, as well as the per cent coating composition retained on each glass cloth sample. In addition to the results found in the following Table III, it was also noted that in every case where the triphenyl phosphate had been incorporated, the coated cloth containing the protective coating thereon was extremely flexible and quite usable, while the control sample from which the triphenyl phosphate had been omitted had powdered on the surface so that it could easily be blown away to expose the bare glass cloth surface.

Table III

| Sample No | Control | 8 | 9 | 10 |
|---|---|---|---|---|
| Parts organophosphorus compound per 400 parts polydimethyl siloxane. | None | 0.1 | 0.5 | 5.0. |
| Ratio of mols organophosphorus compound per mol KOH. | do | Slightly less than 0.5/1. | Slightly more than 2/1. | Slightly more than 20/1. |
| Percent cured coating composition retained. | 0% | [1] 37% | 74% | 80%. |

[1] The percent retainment of coating on the glass cloth could be increased to 80 percent by incorporating an additional 1.3 parts triphenyl phosphate in the coating composition after formation of the latter and before application to the cloth.

As pointed out above, in the preparation of the convertible organopolysiloxanes, the latter are quite variable

Table II

| Sample No. | 1 | 2 | 3 | 4 | 5 | 6 | 7 | 8 |
|---|---|---|---|---|---|---|---|---|
| After 24 hrs. @ 250° C.: | | | | | | | | |
| Tensile | 600 p. s. i | 650 p. s. i | 685 p. s. i | | | | | |
| Elongation | 240% | 240% | 240% | | | | | |
| After 72 hrs. @ 250° C.: | | | | | | | | |
| Tensile | 550 p. s. i | | | | | | | |
| Elongation | 150% | | | | | | | |
| After 96 hrs. @ 250° C. and 24 hrs. @ 300° C.: | | | | | | | | |
| Tensile | Disintegrated[1] | 685 p. s. i | 725 p. s. i | | | | | |
| Elongation | | 130% | 145% | | | | | |
| After 96 hrs. @ 250° C. and 48 hrs. @ 300° C.: | | | | | | | | |
| Tensile | do.[1] | | | 600 p. s. i | 650 p. s. i | | | |
| Elongation | | | | 120% | 130% | | | |
| After 96 hrs. @ 250° C. and 72 hrs. @ 300° C.: | | | | | | | | |
| Tensile | do.[1] | | | | | 615 p. s. i | 630 p. s. i | |
| Elongation | | | | | | 100% | 90% | |
| After 1 hr. @ 150° C. and 1 hr. @ 250° C. and 96 hrs. @ 300° C.: | | | | | | | | |
| Tensile | do.[1] | | | | | | | 540 p. s. i. |
| Elongation | | | | | | | | 75%. |

[1] Sheets completely crumbled.

under storage conditions. Thus, it has been found that when the convertible organopolysiloxane is stored under conditions of high humidity, there is a tendency for the convertile organopolysiloxane to decrease in molecular weight and viscosity, and to become "soupy." When the convertible organopolysiloxane is stored in the absence of any humidity for long periods of time, it is found that the product tends to become more viscous and somewhat "nervy" making it difficult to disperse on the rubber mill and to incorporate modifying ingredients including the filler and curing agent.

One method for determining the stability under various storage conditions of the convertible organopolysiloxane is by determining penetrometer readings on the latter in accordance with a modification of ASTM–D217–44T in which the modification consists in employing a one-quarter inch diameter cylinder as the foot and a 100 gram load on the shaft. The following example illustrates the effect of storing the convertible organopolysiloxanes under various storage conditions as well as the effect of adding two organophosphorus compounds, specifically tricresyl phosphate triphenyl phosphate described above.

EXAMPLE 6

A mixture of ingredients comprising 100 parts octamethylcyclotetrasiloxane, 0.01 part KOH, and 0.033 part decamethyltetrasiloxane was heated at a temperature of about 150° C. for about 4 hours to give a highly viscous convertible polydimethylsiloxane which had very little flow at room temperature. To portions of the hot convertible polydimethylsiloxane was added 0.05 per cent, by weight, of either tricresyl phosphate or triphenyl phosphate, based on the weight of the convertible polydimethylsiloxane. A control was prepared under identical conditions except the organophosphorus compound was omitted; the viscosity of the control sample was higher than the treated and untreated polymers. Samples of the treated and untreated polymers were then maintained for 43 days under various conditions, one condition being under a relative humidity of 100 per cent and the other condition being below 10 per cent relative humidity. At the beginning and end of each test, each of the samples so employed was tested for viscosity and penetration in accordance with the above-mentioned modified ASTM–D217–44T. The following Table IV shows the results of these various tests.

Table IV

| Sample No. | Viscosity | Penetration | Test Conditions |
|---|---|---|---|
| 11a | 9,000,000 | 1,200 | Original—high humidity. |
|  | 1,200,000 | 1,200 | Original—low humidity. |
| 12a | 9,000,000 | 6,200 | After 43 days—high humidity. |
|  | 32,000,000 | 195 | After 43 days—low humidity. |
| 13b | 5,800,000 | 1,755 | Original—high humidity. |
|  | 5,600,000 | 1,700 | Original—low humidity. |
| 14b | 5,750,000 | 1,685 | After 43 days—high humidity. |
|  | 5,720,000 | 1,610 | After 43 days—low humidity. |
| 15c | 5,350,000 | 1,750 | Original—high humidity. |
|  | 5,400,000 | 1,725 | Original—low humidity. |
| 16c | 5,350,000 | 1,700 | After 43 days—high humidity. |
|  | 5,320,000 | 1,645 | After 43 days—low humidity. | a Control—untreated.
b Contained tricresyl phosphate.
c Contained triphenyl phosphate.

It will, of course, be apparent to those skilled in the art that in addition to the organopolysiloxanes and organophosphorus compounds employed in the foregoing examples, other types of organopolysiloxanes (including those containing minor proportions of intercondensed —Si—R—Si— groups where R is a divalent organic radical, for instance, alkylene radicals, such as methylene radical, or phenylene radical, etc.), as well as different organophosphorus compounds, many examples of which have been described above, may be used without departing from the scope of the invention. The proportions of organophosphorus compounds employed are not critical and may be varied widely employing the excess, if any, to act as plasticizing agent when incorporated in convertible organopolysiloxanes. The time at which the organophosphorus compound is added may, of course, be varied. Thus, the organophosphorus compound may be added to the organopolysiloxane after it has been converted to the desired degree of polymerization in order to stop further increase in viscosity; or the organophosphorus compound may be added to the processed gum at the time the filler and other modifying ingredients are added; or the organophosphorus compound may be added to various fillers particularly alkaline fillers such as calcium carbonate fillers (e. g., by treating the filler under suitable conditions), which in turn can be incorporated in the convertible organopolysiloxane on the usual rubber mills. When adding the organophosphorus compound to a convertible organopolysiloxane, improved results are obtained by adding it to the latter before any filler or curing agent has been incorporated.

Obviously, other fillers, many examples of which have been given above, may be employed and various other curing agents specifically adapted for the purpose may be used without departing from the scope of the invention. In making coating compositions from the aforementioned stabilized organopolysiloxanes, the convertible organopolysiloxane, together with the filler and any curing agent which is employed for the purpose, is advantageously dissolved or dispersed, or both dissolved and dispersed in suitable liquid media including benzene, xylene, toluene, etc., in concentrations ranging from about 5 to 50 per cent, by weight, solids, based on the total weight of the coating composition. The use of suitable dispersing and stabilizing agents is not precluded and they are advantageously employed for the purpose. Various heat resistant cloths, particularly glass cloth, asbestos cloth, polyethyleneterephthalate fibers and cloth, polyacrylonitrile fibers and cloth, etc., coated with the above-described stabilized organopolysiloxanes find eminent use for heater or other types of ducts which can be subjected to elevated temperatures of the order of about 250 to 315° C. for much greater periods of time than has heretofore been possible using the convertible organopolysiloxanes free of the above-mentioned organophosphorus compounds. Even after long periods of time at about 315° C., it will be found that large amounts of the coating composition are still available for protecting the heater duct and the latter is still flexible even under extremely drastic temperature conditions.

The cured, solid, elastic organopolysiloxanes prepared in accordance with the present invention are capable of withstanding elevated temperatures (150° to 315° C.) for extended periods of time and also retain their desirable rubbery properties at temperatures as low as —120° F. The high temperature resistance of these materials makes them admirably suitable for applications requiring resistance to higher temperatures for longer periods of time than has heretofore been possible using the convertible organopolysiloxanes previously available. The range of properties described above makes the cured organopolysiloxanes herein described highly useful as insulation materials for electrical conductors, gasket materials, shock absorbers, and for various applications where other natural or synthetic rubbers have heretofore been employed where it is desired to take advantage of the high temperature resistance and the low temperature flexibility of the claimed organopolysiloxane. In connection with the cured products having good low temperature flexibility, it is usually desirable to incorporate in the convertible organopolysiloxane aryl-substituted siloxy units, e. g., either diphenylsiloxy units or methylphenylsiloxy units.

One of the important uses to which my invention can be put is in connection with organopolysiloxanes obtained by polymerization of organopolysiloxanes or by interpolymerization of mixtures of organopolysiloxanes using acidic or acid-type catalysts, as, for instance, sulfuric acid, hydrochloric acid, ferric chloride, etc., as the polymerizing agent. As pointed out above, organopolysiloxanes, particularly organopolysiloxane oils, resins, and rubbers, are usually prepared employing alkaline condensing agents, for instance, alkali-metal hydroxides. However, considerable amounts of organopolysiloxanes are prepared using the above-mentioned acids or acidic-type catalysts. After the polymerization reaction has been completed, it is usually necessary to neutralize the acidic condensing agent employing for the purpose alkaline materials, particularly alkali-metal hydroxides.

Unless residues of alkali-metal hydroxides or salts (including silanolates) resulting from the use thereof are removed, it will be found that at elevated temperatures the latter will tend to affect deleteriously the organopolysiloxane and cause undesirable degradation or depolymerization. Very often it is extremely difficult, and in many cases impossbile, to free the organopolysiloxane completely of these depolymerizing or degrading influences. By means of my invention these difficulties can be readily obviated by incorporating therein small amounts of the organophosphorus compound which will render inert any residual alkali-metal hydroxide or potentially harmful salts in the organopolysiloxane. The ease with which this can be effected and the lack of criticality by which these results can be accomplished recommend the use of my invention in connection with problems of the above type for commercial purposes.

One of the additional unexpected advantages to be derived from the practice of my invention resides in the greatly improved compression set properties obtainable using various compression set additives (e. g., certain quinones, mercurous oxide, etc.) designed to give lower compression set values for convertible organopolysiloxanes. Thus, as a result of the ability to remove readily low boiling, volatile materials from the convertible organopolysiloxane stabilized as a result of the incorporation of the organophosphorus compound, it has been found that the addition of the usual low compression set additives gives better low compression set characteristics than has heretofore been obtainable using convertible organopolysiloxanes from which the low boiling volatiles have not been removed with the aforesaid compression set additives.

What I claim as new and desire to secure by Letters Patent of the United States is:

1. A composition of matter of improved stability at normal and elevated temperatures, which composition comprises (1) an organopolysiloxane polymerized with an alkali-metal compound which is a basic siloxane rearranging and polymerizing agent containing an alkali-metal ion used in the preparation of higher molecular weight organopolysiloxanes from lower molecular weight organopolysiloxanes, and (2) an alkali-metal deactivating organophosphorus compound which is free of silicon-bonded halogen, the organic groups of the aforesaid organo-polysiloxane and organo-phosphorus compound being selected from the class consisting of monovalent hydrocarbon and halogenated hydrocarbon radicals.

2. A composition of matter of improved stability at normal and elevated temperatures comprising (1) a higher molecular weight organopolysiloxane resulting from the polymerization of a lower molecular weight organopolysiloxane employing an alkali-metal compound as the polymerizing agent and containing a unit of the formula $$-\underset{|}{\overset{|}{\mathrm{Si}}}\mathrm{OM}$$

where M is an alkali-metal, said alkali-metal compound being a basic siloxane rearranging and polymerizing agent containing an alkali-metal ion used in the preparation of higher molecular weight organopolysiloxanes from lower molecular weight organopolysiloxanes, and (2) an alkali-metal deactivating organophosphorus compound free of phosphorus-bonded halogen, a portion of which is capable of replacing the alkali-metal above to form in its place a silanolate unit stable at elevated temperatures, the residue of said organophosphorus derivative forming with the replaced alkali-metal a composition which is substantially inert at the elevated temperatures to which the organopolysiloxane may be subjected, the organic groups of the aforesaid organopolysiloxane and organophosphorus compound being selected from the class consisting of hydrocarbon and halogenated hydrocarbon radicals.

3. A composition of matter having improved stability at both normal and elevated temperatures, the said composition comprising (1) an organopolysiloxane composition obtained by polymerization of the organopolysiloxane with an alkali-metal compound which is a basic siloxane rearranging and polymerizing agent containing an alkali-metal ion used in the preparation of higher molecular weight organopolysiloxanes from lower molecular weight organopolysiloxanes, wherein the organic groups of the organopolysiloxane are attached to silicon by carbon-silicon linkages and are selected from the class consisting of alkyl, aryl, alkaryl and aralkyl radicals, and the alkali-metal compound is selected from the class consisting of alkali-metal hydroxides, alkali-metal alkoxides, alkali-metal silanolates, alkali-metal complexes having the formula $(ROH)_xMOH$ where R is an alkyl radical, M is an alkali-metal and $x$ is a value equal to from 0.5 to 2.5, alkali-metal thioalkoxides and alkali-metal salts of organopolysiloxanes, and (2) an alkali-metal deactivating organophosphorus compound free of phosphorus-bonded halogen and present in at least a stabilizing amount for the above organopolysiloxane composition, the said organophosphorus compound being selected from the class consisting of organic phosphates, organic thiophosphates, organic phosphites, organic thiophosphites, organic phosphonates, organic phosphinic acids and organic phosphonic acids, the organic groups of the aforesaid organopolysiloxane and organophosphorus compounds being selected from the class consisting of monovalent hydrocarbon and halogenated hydrocarbon radicals.

4. A composition of matter of improved stability at normal and elevated temperatures comprising (1) an organopolysiloxane resulting from the polymerization of a lower molecular weight organopolysiloxane by treatment of the latter with an alkali-metal compound which is a basic siloxane rearranging and polymerizing agent containing an alkali-metal ion used in the preparation of higher molecular weight organopolysiloxanes from lower molecular weight organopolysiloxanes, and (2) triphenyl phosphate, the organic groups of the aforesaid organopolysiloxane being selected from the class consisting of monovalent hydrocarbon and halogenated hydrocarbon radicals.

5. A composition of matter of improved stability at normal and elevated temperatures comprising (1) an organopolysiloxane resulting from the polymerization of a lower molecular weight organopolysiloxane by treatment of the latter with an alkali-metal compound which is a basic siloxane rearranging and polymerizing agent containing an alkali-metal ion used in the preparation of higher molecular weight organopolysiloxanes from lower molecular weight organopolysiloxanes, and (2) tricresyl phosphate, the organic groups of the aforesaid organopolysiloxane being selected from the class consisting of monovalent hydrocarbon and halogenated hydrocarbon radicals.

6. A composition of matter of improved stability at normal and elevated temperatures comprising (1) an organopolysiloxane resulting from the polymerization of a lower molecular weight organopolysiloxane by treatment of the latter with an alkali-metal compound which is a basic siloxane rearranging and polymerizing agent containing an alkali-metal ion used in the preparation of higher molecular weight organopolysiloxanes from lower molecular weight organopolysiloxanes, and (2) triphenyl phosphite, the organic groups of the aforesaid organopolysiloxane being selected from the class consisting of monovalent hydrocarbon and halogenated hydrocarbon radicals.

7. A composition of matter having improved stability at normal and elevated temperatures comprising (1) a methylpolysiloxane obtained by polymerizing a lower molecular weight methylpolysiloxane with an alkali-metal hydroxide and (2) tricresyl phosphate.

8. A composition of matter having improved stability at normal and elevated temperatures comprising (1) a methylpolysiloxane obtained by polymerizing a lower molecular weight methylpolysiloxane with an alkali-metal hydroxide and (2) triphenyl phosphate.

9. A composition of matter having improved stability at normal and elevated temperatures comprising (1) a methylpolysiloxane obtained by polymerizing a lower molecular weight methylpolysiloxane with an alkali-metal hydroxide and (2) triphenyl phosphite.

10. A composition of matter of improved stability at normal and elevated temperatures comprising (1) a methylpolysiloxane resulting from the interpolymerization of a mixture of lower molecular weight methylpolysiloxanes employing an alkali-metal hydroxide as the polymerizing agent and (2) triphenyl phosphate.

11. A composition of matter of improved stability at normal and elevated temperatures comprising (1) a methylpolysiloxane resulting from the interpolymerization of a mixture of ingredients comprising a lower molecular weight methylpolysiloxane and a lower molecular weight phenylpolysiloxane employing an alkali-metal hydroxide as the polymerizing agent, and (2) triphenyl phosphate.

12. A composition of matter comprising (1) a methylpolysiloxane convertible to the cured, solid, elastic state resulting from the polymerization of a lower molecular weight methylpolysiloxane employing potassium hydroxide as the polymerizing agent, (2) a stabilizing amount of triphenyl phosphate, (3) a filler, and (4) a curing agent for (1).

13. The heat-treated product of claim 12.

14. A composition of matter comprising (1) a methylpolysiloxane convertible to the cured, solid, elastic state resulting from the polymerization of a lower molecular weight methylpolysiloxane employing potassium hydroxide as the polymerizing agent, (2) a stabilizing amount of triphenyl phosphate, (3) a filler comprising a metallic oxide and (4) benzoyl peroxide.

15. The heat-treated product of claim 14.

16. A composition of matter comprising (1) a methylpolysiloxane convertible to the cured, solid, elastic state resulting from the polymerization of a lower molecular weight methylpolysiloxane employing potassium hydroxide as the polymerizing agent, (2) a stabilizing amount of tricresyl phosphate, (3) a filler comprising a metallic oxide, and (4) benzoyl peroxide.

17. The heat-treated product of claim 16.

18. A composition as in claim 16 in which the metallic oxide filler is silica aerogel.

19. An organopolysiloxane composition of improved stability at elevated temperatures comprising (1) a methyl phenylpolysiloxane resulting from the polymerization of a mixture of organopolysiloxanes comprising a methylpolysiloxane and a phenylpolysiloxane employing potassium hydroxide as the polymerizing agent, and (2) an amount of an organophosphorus compound free of phosphorus-bonded halogen and sufficient to render substantially inert any undesirable degrading effect of the potassium ion in the aforesaid methyl phenylpolysiloxane, the organic groups of the aforesaid organophosphorus compound being selected from the class consisting of monovalent hydrocarbon and halogenated hydrocarbon radicals.

20. An organopolysiloxane composition as in claim 19 in which the stabilizing organophosphorus compound is triphenyl phosphate.

21. An organopolysiloxane composition as in claim 19 in which the stabilizing organophosphorus compound is tricresyl phosphate.

22. The process for improving the stability at elevated temperatures of an organopolysiloxane resulting from the polymerization of a composition comprising a lower molecular weight organopolysiloxane with an alkali-metal compound which is a basic siloxane rearranging and polymerizing agent containing an alkali-metal ion used in the preparation of higher molecular weight organopolysiloxanes from lower molecular weight organopolysiloxanes, the aforesaid organopolysiloxane after polymerization containing alkali-metal products capable of causing undesirable degradation of the said organopolysiloxane at elevated temperatures, which process comprises incorporating in the aforesaid higher molecular weight organopolysiloxane a stabilizing amount of an alkali-metal deactivating organophosphorus compound free of phosphorus-bonded halogen and capable of preventing undesirable degrading and depolymerizing action by the alkali metal, the organic groups of the aforesaid organopolysiloxane and organophosphorus compound being selected from the class consisting of monovalent hydrocarbon and halogenated hydrocarbon radicals.

23. The process for removing low boiling, volatile organopolysiloxanes from a high molecular weight organopolysiloxane resulting from the polymerization of a mixture of ingredients comprising a lower molecular weight organopolysiloxane employing as the polymerizing agent an alkali-metal compound which is a basic siloxane rearranging and polymerizing agent containing an alkali-metal ion used in the preparation of higher molecular weight organopolysiloxanes from lower molecular weight organopolysiloxanes, which process comprises (1) dispersing in the aforesaid high molecular weight organopolysiloxane stabilizing amounts of an alkali-metal deactivating organophosphorus compound free of phosphorus-bonded halogen, and (2) thereafter removing the low boiling volatile organopolysiloxanes whereby undesirable degradation and depolymerization of the organopolysiloxane is substantially minimized, the organic groups of the aforesaid organopolysiloxane and organophosphorus compound being selected from the class consisting of monovalent hydrocarbon and halogenated hydrocarbon radicals.

24. The process for removing low boiling, volatile methylpolysiloxanes from a high molecular weight methylpolysiloxane resulting from the polymerization of a low molecular weight methylpolysiloxane employing potassium hydroxide as the polymerizing agent, which process comprises (1) dispersing in the aforesaid high molecular weight methylpolysiloxane stabilizing amounts of tricresyl phosphate, and (2) thereafter subjecting the mixture of ingredients to distillation at elevated temperatures whereby the low boiling, volatile materials are readily removed without undesirable degradation and depolymerization of the higher molecular weight methylpolysiloxane.

25. The process for removing low boiling, volatile methyl phenylpolysiloxanes resulting from the polymerization of a mixture of ingredients comprising a lower molecular weight methylpolysiloxane and a lower molecular weight phenylpolysiloxane, which process comprises (1) dispersing in the aforesaid high molecular weight methyl phenylpolysiloxane stabilizing amounts of tricresyl phosphate, and (2) thereafter subjecting the mixture of ingredients to distillation at elevated temperatures whereby the low boiling volatile materials are readily removed with a minimum of degradation and depolymerization of the higher molecular weight methyl phenylpolysiloxane.

26. The process for removing low boiling, volatile methylpolysiloxanes from a high molecular weight methylpolysiloxane resulting from the polymerization of a low molecular weight methylpolysiloxane with potassium hydroxide, which process comprises (1) dispersing in the aforesaid high molecular weight methylpolysiloxane stabilizing amounts of triphenyl phosphate, and (2) thereafter subjecting the mixture of ingredients to distillation at elevated temperatures whereby the low boiling, volatile materials are readily removed without undesirable degradation and depolymerization of the higher molecular weight methylpolysiloxane.

27. The process for removing low boiling, volatile methylpolysiloxanes from a high molecular weight methylpolysiloxane resulting from the polymerization of a low molecular weight methylpolysiloxane employing potassium hydroxide as the polymerizing agent, which process comprises (1) dispersing in the aforesaid high molecular weight methylpolysiloxane stabilizing amounts of triphenyl phosphite, and (2) thereafter subjecting the mixture of ingredients to distillation at elevated temperature whereby the low boiling volatile materials are readily removed with a minimum of undesirable degradation and depolymerization of the higher molecular weight methylpolysiloxane.

References Cited in the file of this patent

UNITED STATES PATENTS 2,492,129   Sprung _____ Dec. 20, 1949